(12) United States Patent
Nomura et al.

(10) Patent No.: US 8,500,330 B2
(45) Date of Patent: Aug. 6, 2013

(54) PACKAGING BAG AND MANUFACTURING METHOD THEREOF

(75) Inventors: Tadashi Nomura, Tokyo (JP); Masakazu Sato, Tokyo (JP)

(73) Assignee: Oshio Industry Co., Ltd. (JP)

( * ) Notice: Subject to any disclaimer, the term of this patent is extended or adjusted under 35 U.S.C. 154(b) by 858 days.

(21) Appl. No.: 12/069,070

(22) Filed: Feb. 7, 2008

(65) Prior Publication Data

US 2008/0193057 A1 Aug. 14, 2008

(30) Foreign Application Priority Data

Feb. 8, 2007 (JP) ................................ 2007-029709

(51) Int. Cl.
*B65D 33/02* (2006.01)
*B65D 30/16* (2006.01)
*B65D 30/00* (2006.01)

(52) U.S. Cl.
USPC ............ 383/119; 383/104; 383/107; 383/906

(58) Field of Classification Search
USPC ............... 383/119, 104, 107, 903, 906, 9, 17, 383/20, 22
See application file for complete search history.

(56) References Cited

U.S. PATENT DOCUMENTS

| 8,206,033 B2 * | 6/2012 | Sato et al. ..................... 383/104 |
| 2002/0102032 A1 | 8/2002 | Sturgis |
| 2003/0077006 A1 | 4/2003 | Siegel |

FOREIGN PATENT DOCUMENTS

| DE | 94 08 454 U | | 7/1994 |
| EP | 1 757 531 A | | 2/2007 |
| JP | 34-007231 B1 | | 8/1959 |
| JP | 2002136573 A | * | 5/2002 |
| JP | 2003-191964 A | | 7/2003 |
| JP | 2003285348 A | * | 10/2003 |
| JP | 2005170396 A | * | 6/2005 |
| WO | WO 2005/039992 A | | 5/2005 |

OTHER PUBLICATIONS

AIPN online translation of JP 2005170396 A. Translated on Jul. 18, 2011.*
Machine translation of Japanese Document No. 2002-136573. Translated on Feb. 5, 2011.*
Japanese Notice of Allowance dated Jun. 5, 2012.

* cited by examiner

*Primary Examiner* — Jes F Pascua
(74) *Attorney, Agent, or Firm* — Berliner & Associates

(57) ABSTRACT

A packaging bag is provided with a bag body and thermoplastic resin-made reinforcing members provided at the outer edge of the bag body. A window is provided in each reinforcing member. In forming the packaging bag, the bag body is placed between a pair of molds respectively having recesses to clamp these two molds so that a corresponding pair of the recesses are opposed to each other. Thereafter, in order to form the reinforcing members at the outer edge of the bag body, melted or softened thermoplastic resin is injected to fill cavities formed by the recesses of the thus clamped molds. Each of the cavities of the molds is formed so as to coincide with an outer shape of the corresponding reinforcing member. A projection extends from the bottom face of each recess at a part of the cavity corresponding to a part of each reinforcing member on which the window is provided. The outer edge of the bag body placed between the two molds is placed inside the cavities in a state of being held between the two projections.

5 Claims, 5 Drawing Sheets

PACKAGING BAG AND MANUFACTURING METHOD THEREOF

BACKGROUND OF THE INVENTION

The present invention relates to a packaging bag provided with a reinforcing member and a method for manufacturing the packaging bag.

For the purpose of preventing the collapse of a packaging bag and improving the self-standing feature, there is conventionally known, for example, reinforcement in which a reinforcing member is used to reinforce a bag body made by bonding together a pair of resin sheets. For example, Japanese Laid-Open Patent Publication No. 2003-191964 discloses a packaging bag in which a thermoplastic resin reinforcing member extends over the upper outer edge and both side outer edges of a bag body.

The reinforcing member described in the above publication is formed as follows. First, as shown in FIG. 6A, the bag body 63 is placed between a lower mold 61 and an upper mold 62, and the molds 61, 62 are clamped. In this states, the upper outer edge and both side outer edges of the bag body 63 are respectively projected only by a predetermined length of L into a recess 61a formed in the lower mold 61. With this state kept, thermoplastic resin is injected to the recess 61a of the lower mold 61, thereby forming a lower divided half 64 of the reinforcing member. Then, as shown in FIG. 6B, the upper mold 62 is allowed to slide in such a manner that the recess 61a of the lower mold 61 is placed opposing a recess 62a formed in the upper mold 62. With this state kept, thermoplastic resin is injected to the recess 62a of the upper mold 62, thereby forming an upper divided half 65 of the reinforcing member. The reinforcing member is constituted with the thus formed lower divided half 64 and upper divided half 65.

When the packaging bag falls, for example, and such an impact that allows mutually-bonded resin sheets of the bag body 63 to be spaced away from each other is given to the packaging bag, the reinforcing member may be broken or peeled off the bag body 63, depending on the magnitude of the impact. Therefore, in view of preventing the reinforcing member from being broken or peeled off, it is preferable to project the upper outer edge and both side outer edges of the bag body 63 greatly into the recesses 61a, 62a of the molds 61, 62 on injection molding of the reinforcing member, thereby forming the reinforcing member having a greater width. As the reinforcing member is made greater in width, the reinforcing member is increased in impact resistance, thereby preventing the reinforcing member from breakage or peeling.

However, when the upper outer edge or the side outer edge of the bag body 63 is greatly projected into the recesses 61a, 62a of the molds 61, 62, as shown in FIG. 6C, the upper outer edge or the side outer edge of the bag body 63 tends to sag or warp inside the recesses 61a, 62a. In particular, on injection of thermoplastic resin into the recesses 61a, 62a, there is a case where the upper outer edge or the side outer edge of the bag body 63 may warp by heat and flow of injected thermoplastic resin. When the upper outer edge or the side outer edge of the bag body 63 sags or warps inside the recesses 61a, 62a of the molds 61, 62, a difference in thickness occurs between a part of the reinforcing member positioned on the surface of the upper outer edge or the side outer edge of the bag body 63 and a part of the reinforcing member positioned on the back face thereof. As a result, impact resistance of the reinforcing member cannot be sufficiently improved. Further, when the upper outer edge or the side outer edge of the bag body 63 is at least partially exposed outside the reinforcing member because of the sag or warp of the upper outer edge or the side outer edge of the bag body 63, the appearance of the packaging bag will be degraded.

SUMMARY OF THE INVENTION

Accordingly, it is an objective of the present invention to reliably improve the impact resistance of a reinforcing member formed on a packaging bag.

To achieve the foregoing objective and in accordance a first aspect of the present invention, a packaging bag including a bag body and a thermoplastic resin-made reinforcing member is provided. The thermoplastic resin-made reinforcing member is provided at an outer edge of the bag body. A window is provided in the reinforcing member.

In accordance with a second aspect of the present invention, a method for manufacturing the packaging bag according to the first aspect of the present invention is provided. The method includes: placing the bag body between a pair of molds respectively having a recess and clamping the two molds in such a manner that the recesses are opposed to each other, wherein a cavity formed by the recesses of the thus clamped molds is formed so as to coincide with an outer shape of the reinforcing member, a projection extends from a bottom face of each recess at a part of the cavity corresponding to a part of the reinforcing member on which the window is provided, and the outer edge of the bag body placed between the two molds is placed inside the cavity in a state of being held by the two projections; and injecting melted or softened thermoplastic resin to fill the cavity of the thus clamped molds in order to form the reinforcing member at the outer edge of the bag body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An explanation will be made for one embodiment of the present invention by referring to FIGS. 1 to 4. Unless otherwise specified, in the following explanation, a perpendicular direction (vertical direction) and a horizontal direction are those given in FIGS. 1 to 3.

Figure 1:
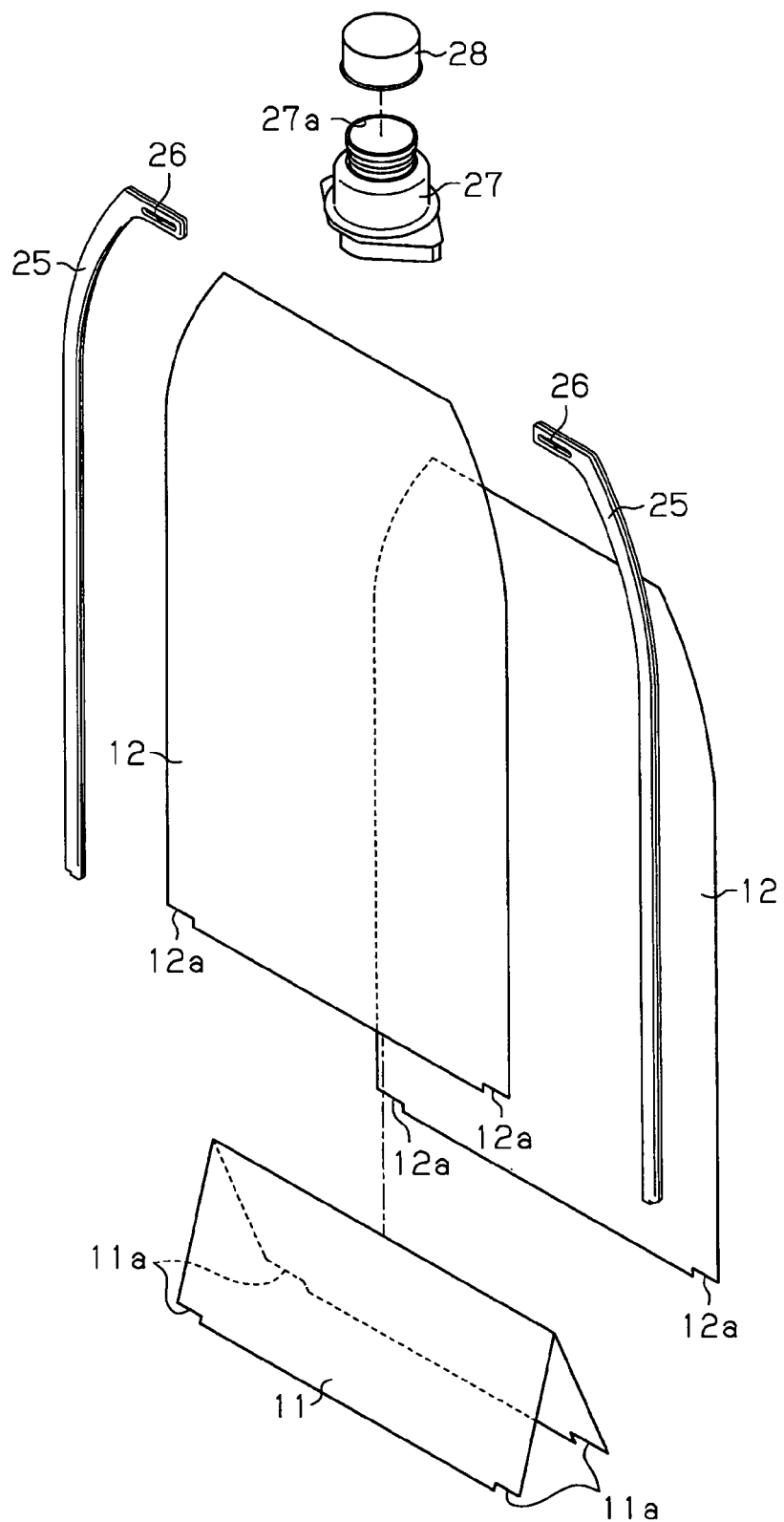
FIG. 1 is an exploded perspective view of a packaging bag according to one embodiment of the present invention.
Figure 2:
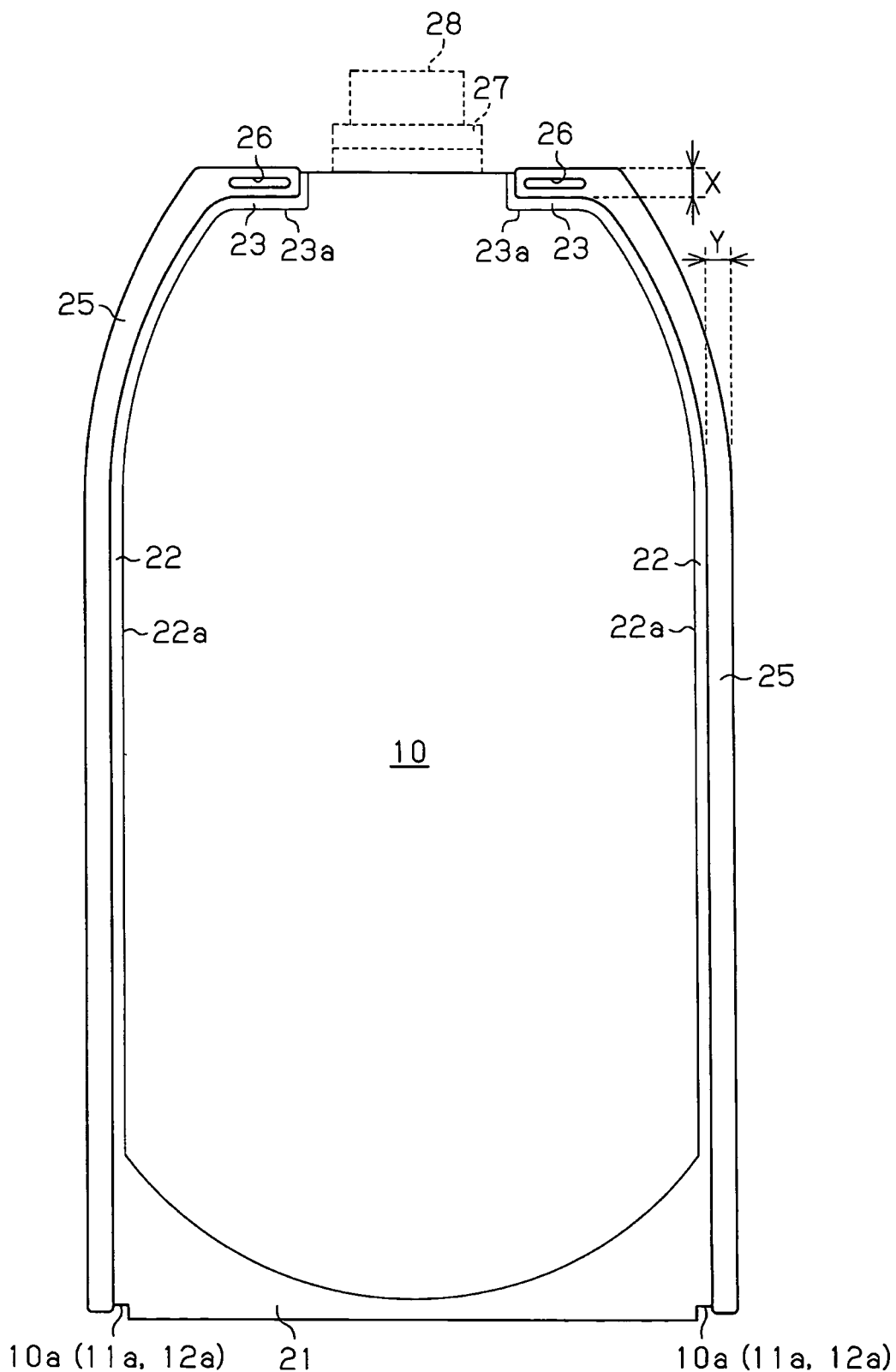
FIG. 2 is a front elevational view of the packaging bag shown in FIG. 1.
Figure 3:
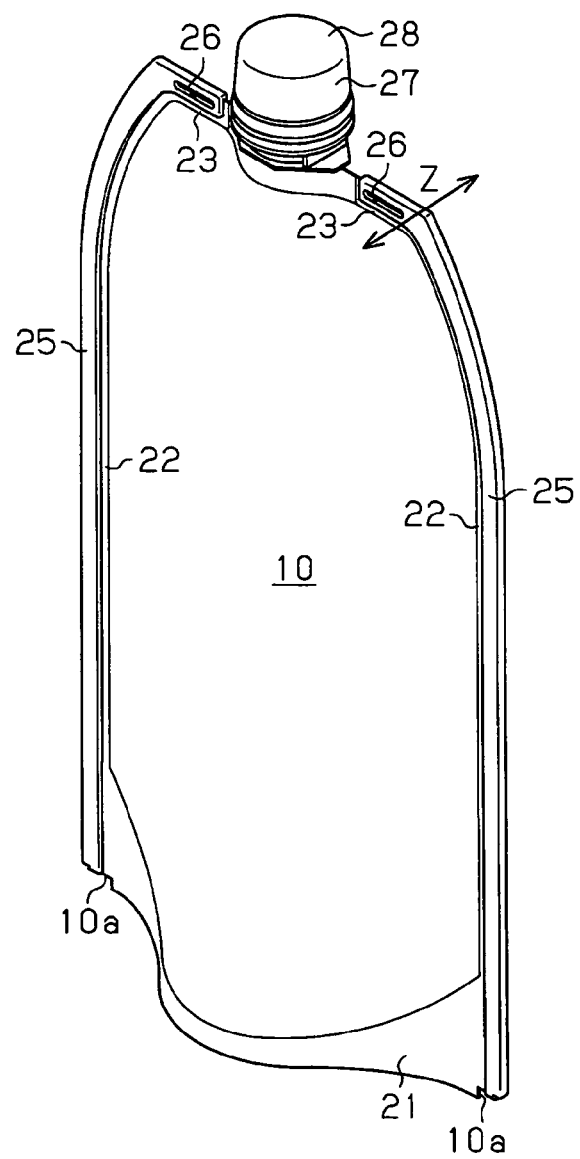
FIG. 3 is a perspective view of the packaging bag shown in FIG. 1.

As shown in FIGS. 1 to 3, a packaging bag of the present embodiment is provided with a bag body 10, two columnar reinforcing members 25 provided on both sides of the bag body 10, and a tubular neck 27 provided at the upper part of the bag body 10.

As shown in FIG. 1, the bag body 10 is constituted with a bottom sheet 11 and a pair of side sheets 12. The bottom sheet 11, either face of which is heat weldable, is obtained by folding a rectangular sheet having a rectangular notch 11a at each of four corners into two, with a heat weldable face kept outside.

Each of the side sheets 12 is formed approximately in a regular trapezoidal shape, having a rectangular notch 12a at each of two lower corners. The notches 12a of the side sheets 12 are identical in shape and size with the notches 11a of the bottom sheet 11. Each of the side sheets 12 is heat weldable on one of the two faces.

In forming the bag body 10 with the bottom sheet 11 and the side sheets 12, heat weldable faces of the side sheets 12 are placed so as to oppose each other and also the bottom sheet 11 is placed between these two side sheets 12. At this time, as shown in FIG. 1, the fold of the bottom sheet 11 is kept faced upward. Further, notches 12a of the side sheets 12 are respectively superimposed on the corresponding notches 11a of the bottom sheet 11. Thereafter, lower parts of the heat weldable faces of the side sheets 12 are heat welded to the heat weldable face of the bottom sheet 11. Further, the side outer edges of one of the two side sheets 12 are respectively heat welded to the corresponding side outer edges of the other side sheet 12, and the upper outer edges, that is, parts excluding the central portions thereof are also heat welded to each other.

Bottom heat-welded portions 21, which are heat welded parts of the bottom sheet 11 and the side sheets 12, are, as shown in FIG. 2, each provided with an upper edge formed in a recessed circular arc shape when viewed from the front side. As described above, the notches 12a of the side sheets 12 are respectively superimposed on the corresponding notches 11a of the bottom sheet 11, by which the bag body 10 is to have a notch 10a at each of two lower corners. Side heat-welded portions 22, which are heat welded parts of the side outer edges of the side sheets 12, extend approximately in a vertical direction. Upper heat-welded portions 23, which are heat welded parts of upper outer edges of the side sheets 12, extend in the horizontal direction. The upper outer edge centers of the side sheets 12 are not heat welded to each other.

The reinforcing members 25 are made of thermoplastic resin. Each of the reinforcing members 25 is provided, as shown in FIGS. 2 and 3, along the corresponding side heat-welded portion 22 and the corresponding upper heat-welded portion 23. The lower ends of the reinforcing member 25 are positioned above the bottom outer edge of the bag body 10, and respectively face the corresponding notches 10a of the bag body 10. Each of the reinforcing members 25 is provided with an approximately U-shaped cross section in its transverse direction, enclosing the outer edge of the corresponding side heat-welded portion 22 and that of the corresponding upper heat-welded portion 23. As shown in FIG. 2, the inner edge 22a of each of the side heat-welded portions 22 and the inner edge 23a of each of the upper heat-welded portions 23 are not covered with the corresponding reinforcing member 25 but exposed. The transverse dimension X of a part of each of the reinforcing members 25 positioned on the corresponding upper heat-welded portion 23, is greater than the transverse dimension Y of a part of the reinforcing member 25 positioned on the corresponding side heat-welded portion 22.

A part of each of the reinforcing members 25 positioned on the corresponding upper heat-welded portion 23 of the bag body 10 is provided with an elongated window 26 at a place closer to the center of the upper outer edge of the bag body 10. Each of the windows 26 is rounded off at both ends. The longitudinal direction of each of the windows 26 is made coincident with the horizontal direction in FIG. 2. The longitudinal dimension of each of the windows 26 is shorter than the longitudinal dimension of the corresponding upper heat-welded portion 23. The transverse dimension of each of the windows 26 is about ⅓ the transverse dimension X of the part of the corresponding reinforcing member 25 positioned on the corresponding upper heat-welded portion 23. Each of the windows 26 is positioned at the center in the transverse direction in the part of the reinforcing member 25 positioned on the corresponding upper heat-welded portion 23. Each of the windows 26 is located at a part of the corresponding reinforcing member 25 positioned internally from the outermost edge of the corresponding upper heat-welded portion 23 in such a manner that the outermost edge of the upper heat-welded portion 23 is not positioned inside the window 26.

As shown in FIGS. 2 and 3, the neck 27 is provided at the upper part of the bag body 10, more specifically, at the center of the upper outer edge of the bag body 10. The packaging bag is capable of having the contents taken out or put into the bag body 10 through a port 27a (refer to FIG. 1) provided at the upper end of the neck 27. The neck 27 is provided with a cap 28 for sealing the port 27a in a removable manner. The cap 28 can be turned around so as to be attached to or detached from the neck 27.

Next, an explanation will be made for a pair of molds 41 used in forming the reinforcing members 25 by referring to FIG. 4.

Figure 4:
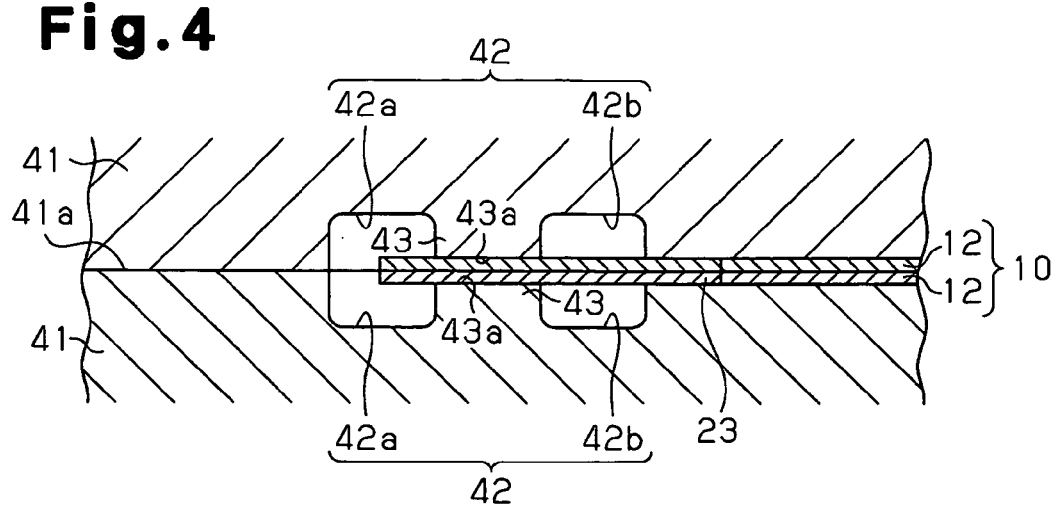
FIG. 4 is a cross-sectional view for explaining a method for forming a reinforcing member of the packaging bag shown in FIG. 1.

The molds 41, which are arranged vertically in FIG. 4, are respectively provided with two recesses 42. Each of two cavities formed by the recesses 42 of the molds 41, when the molds 41 are clamped so that the corresponding recesses 42 are opposed to each other, is formed so as to coincide with an outer shape of the corresponding reinforcing member 25. A part of the cavity corresponding to a part of each of the reinforcing members 25 at which the corresponding window 26 is located is provided with projections 43 extending from the bottom face of each recess 42. Therefore, at the same part of each of the cavities, each recess 42 is divided into an outer part 42a and an inner part 42b by the corresponding projection 43. The transverse cross section of each projection 43 is formed in an elongated shape coinciding with a projected shape of the corresponding window 26, and each projection 43 is rounded off at both ends. The longitudinal direction of each projection 43 is made coincident with the longitudinal direction of the part of the cavity corresponding to the part of each of the reinforcing members 25 at which the corresponding window 26 is provided.

In forming the reinforcing members 25, the molds 41 are clamped in such a manner that the bag body 10 is placed between these two molds 41 and a corresponding pair of the recesses 42 are opposed to each other. In this instance, the projections 43 provided on one of the two molds 41 are respectively placed so as to oppose the corresponding projections 43 provided on the other mold 41 via the bag body 10. In FIG. 4, the thickness of the bag body 10 is magnified for easy illustration, and a matching face 41a of each mold 41 is, therefore, not flush in its entirety and also a top face 43a of each projection 43 is not flush with the matching face 41a of the corresponding mold 41. However, in reality, the bag body 10 is extremely thin, and the matching face 41a of each mold 41 is flush in its entirety and also the top face 43a of each projection 43 is flush with the matching face 41a of the corresponding mold 41.

Further, in the molds 41 which are clamped, with the bag body 10 held therebetween as described above, both of the side outer edges and a part of the upper outer edge of the bag body 10, more specifically, the outer edge of each of the side heat-welded portions 22 and the outer edge of each of the upper heat-welded portions 23, are placed inside the cavities formed by the recesses 42 of the molds 41. The inner edge 22a of each of the side heat-welded portions 22 and the inner edge 23a of each of the upper heat-welded portions 23 are not placed inside the cavities but placed between the matching faces 41a of the molds 41. Inside each of the cavities, the outer edge of the corresponding upper heat-welded portion 23 is held between a pair of corresponding projections 43 in such a manner that the outermost edge of the upper heat-welded portion 23 is positioned inside a part of the cavity formed by the outer parts 42a of the corresponding recesses 42.

Thereafter, melted or softened thermoplastic resin is injected to fill the cavities through a resin filling port (not illustrated). The thermoplastic resin injected into the cavities fills the cavities so as to avoid the projections 43 inside the recesses 42. As a result, the reinforcing members 25 can be obtained, each of which has the window 26 at a site corresponding to the associated projection 43.

According to the above embodiment, the following advantages are obtained.

(1) In order to form the window 26 at the part of each of the reinforcing members 25 positioned on the corresponding upper heat-welded portion 23 of the bag body 10, the projection 43 is provided at each of the recesses 42 of the molds 41. Therefore, at each of the cavities on the molds 41, the outer edge of the corresponding upper heat-welded portion 23 is held between a corresponding pair of projections 43. As a result, even when the outer edge of each of the upper heat-welded portions 23 is projected greatly into the corresponding cavity in order to increase the transverse dimension X of the part of the corresponding reinforcing member 25 positioned on the upper heat-welded portion 23, it is possible to prevent the upper heat-welded portion 23 from sagging or warping inside the cavity. Thus, a decrease in impact resistance of the reinforcing members 25 resulting from the sag and warp of the upper heat-welded portions 23 is prevented, thereby making it possible to reliably improve the impact resistance of the reinforcing members 25. A degradation in appearance of the packaging bag due to the sag and warp of the upper heat-welded portion 23 is also prevented.

In order to prevent a decrease in impact resistance of the reinforcing members 25 or a degradation in appearance of the packaging bag when the upper heat-welded portions 23 sag or warp, the reinforcing members 25 may be made thick. That is, the dimension of each of the reinforcing members 25 in the direction given in the arrow Z in FIG. 3 may be made large. However, in this instance, the quantity of thermoplastic resin used in forming the reinforcing members 25 is increased to inevitably result in an increase in the cost of the packaging bag. The present embodiment is advantageous in that the reinforcing member 25 and the packaging bag can be respectively prevented from a decrease in impact resistance and degradation in appearance without an increase in cost.

(2) If a part of the top face 43a of each projection 43 is not in contact with the corresponding upper heat-welded portion 23 at each cavity of the molds 41, thermoplastic resin injected into the cavity oozes out between the projection 43 and the upper heat-welded portion 23, and burrs may develop on the windows 26. However, in the above embodiment, since each of the windows 26 is provided further inside from the outermost edge of the corresponding upper heat-welded portion 23 in such a manner that the outermost edge of the upper heat-welded portion 23 is not positioned inside the window 26, the top face 43a of each projection 43 is in its entirety in contact with the corresponding upper heat-welded portion 23 at each cavity of the molds 41. Therefore, it is possible to prevent burrs from developing on each window 26.

(3) In the above embodiment, the windows 26 are respectively provided at the corresponding reinforcing members 25 so that the neck 27, which is positioned at the center of the upper outer edge of the bag body 10, is located between the windows 26, and the windows 26 are in the vicinity of the neck 27. Therefore, the windows 26 can be used to support the packaging bag for stabilizing the posture of the packaging bag when the bag body 10 is filled with contents through the port 27a of the neck 27.

(4) The longitudinal direction of each of the windows 26 is made coincident with the horizontal direction, and the windows 26 run along the upper outer edge of the bag body 10. In other words, the projection 43 provided at each recess 42 of the molds 41 extends in the longitudinal direction of the upper heat-welded portion 23 placed inside the corresponding cavity of the molds 41. If the longitudinal direction of each projection 43 is not made coincident with the longitudinal direction of the corresponding upper heat-welded portion 23, some sag or warp may be created at a part of the upper heat-welded portion 23 where the projection 43 is greatly spaced away from the outermost edge of the upper heat-welded portion 23. In this respect, with the above embodiment, it is possible to favorably retain the outer edge of each upper heat-welded portion 23 by using a pair of corresponding projections 43, when the molds 41 are clamped, with the bag body 10 placed therebetween.

(5) In order to form the window 26, both ends of which are rounded off, at each reinforcing member 25, the projection 43 provided at each recess 42 of the molds 41 is in such a shape that both ends are rounded off. When thermoplastic resin is injected into cavities of the molds 41, the projections 43 are responsible for preventing a smooth flow of the thermoplastic resin injected into the cavities. However, since each of the projections 43 is in such a shape that both ends are rounded off, it is possible to reduce such influences that a smooth flow of the thermoplastic resin is prevented by the projections 43. Further, in order to place each of the windows 26 at the center in the transverse direction in the part of the corresponding reinforcing member 25 positioned on the corresponding upper heat-welded portion 23, the projection 43 provided at each recess 42 of the molds 41 is provided at the center of the recess 42 in the transverse direction in such a manner that the outer part 42a of the recess 42 is equal in width to the inner part 42b thereof. This is also helpful in reducing such influences that a smooth flow of the thermoplastic resin injected into the cavities of the molds 41 is prevented by the projections 43.

(6) The inner edge 22a of each side heat-welded portion 22 of the bag body 10 and the inner edge 23a of each upper heat-welded portion 23 thereof are not covered by the corresponding reinforcing member 25 but exposed. Therefore, even if such a force acting to separate the mutually-bonded side sheets 12 of the bag body 10 is exerted on the packaging bag, it is possible to prevent the force from directly acting on the reinforcing members 25.

(7) The lower end of each of the reinforcing members 25 faces the corresponding notches 10a of the bag body 10. Therefore, the lower ends of the side outer edges of the bag body 10 are respectively covered by the corresponding reinforcing members 25. If the reinforcing members 25 are formed in such a manner that the lower ends of the side outer edges of the bag body 10 are not respectively covered by the corresponding reinforcing members 25 but exposed, burrs may easily develop at the lower ends of the reinforcing members 25 depending on molds used in forming the reinforcing members 25. In this respect, with the present embodiment, it is possible to suppress the development of burrs at the lower ends of the reinforcing members 25.

(8) Even if the lower ends of the side outer edges of the bag body 10 are respectively covered by the corresponding reinforcing members 25, the bag body 10 is provided with notches 10a, by which the lower end of each of the reinforcing members 25 is positioned above the bottom outer edge of the bag body 10. Therefore, the self-standing feature of the packaging bag is not degraded due to the fact that the lower ends of the side outer edges of the bag body 10 are respectively covered by the corresponding reinforcing members 25.

In addition, the above embodiment may be modified as follows.

Figure 5A:
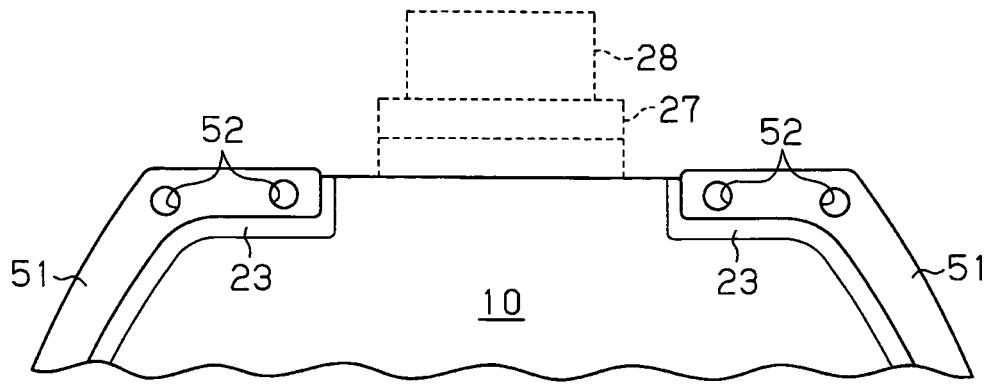
FIGS. 5A, 5B, and 5C are each a front elevational view showing a part of a packaging bag according to another embodiment of the present invention.

The shape and number of the windows 26 are not limited to those given in the above embodiment and may be modified when necessary. For example, as shown in FIG. 5A, each of the reinforcing members 51 may be provided with a plurality of circular windows 52. Alternatively, each of the windows 26 may be formed in an ornamental shape such as a star shape. Further, the longitudinal direction of each of the windows 26 is not necessarily required to be along the upper outer edge of the bag body 10 but may intersect the horizontal direction not along the upper outer edge of the bag body 10.

In the above embodiment, as apparent from FIG. 4, the mutually opposing side surfaces of each projection 43 of the molds 41 are parallel to each other. Therefore, the window 26 of each of the reinforcing members 25 formed by using the molds 41 is defined by wall surfaces in which the mutually opposing parts are parallel to each other. However, the mutually opposing side surfaces of each projection 43 are not necessarily required to be parallel to each other. For example, the mutually opposing side surfaces of each projection 43 may be formed in a tapered shape in such a manner that they come closer to each other from the proximal end of the projection 43 toward the distal end. In this instance, the bag body 10 after the reinforcing members 25 have been injection-molded is more easily released from the molds 41. Further, in this instance, the window 26 of each of the reinforcing members 25 formed by using the molds 41 is defined by wall surfaces in which the mutually opposing parts come closer to each other, as coming closer to the corresponding upper heat-welded portion 23.

Each of the windows 26 may be dimensioned so as to cover substantially a whole part of the corresponding reinforcing member 25 in the longitudinal direction positioned on the corresponding upper heat-welded portion 23.

Instead of each window 26, a plurality of windows may be provided, which are arrayed along the upper outer edge of the bag body 10 substantially at a whole length of the part of each reinforcing member 25 positioned on the corresponding upper heat-welded portion 23. Alternatively or in addition, a plurality of windows may be provided, which are arrayed along the corresponding side outer edge of the bag body 10 substantially at a whole length of a part of each reinforcing member 25 positioned on the corresponding side heat-welded portion 22.

In the above embodiment, each of the windows 26 is provided at the part of the corresponding reinforcing member 25 positioned on the corresponding upper heat-welded portion 23, which part is closer to the center of the upper outer edge of the bag body 10. However, each of the windows 26 may be provided at a part of the corresponding reinforcing member 25 positioned on a part of the corresponding upper heat-welded portion 23, which part is greatly away from the center of the upper outer edge of the bag body 10, or may be provided at a part of the corresponding reinforcing member 25 positioned on the corresponding upper heat-welded portion 23, which part is substantially at the center thereof in the longitudinal direction.

Figure 5B:
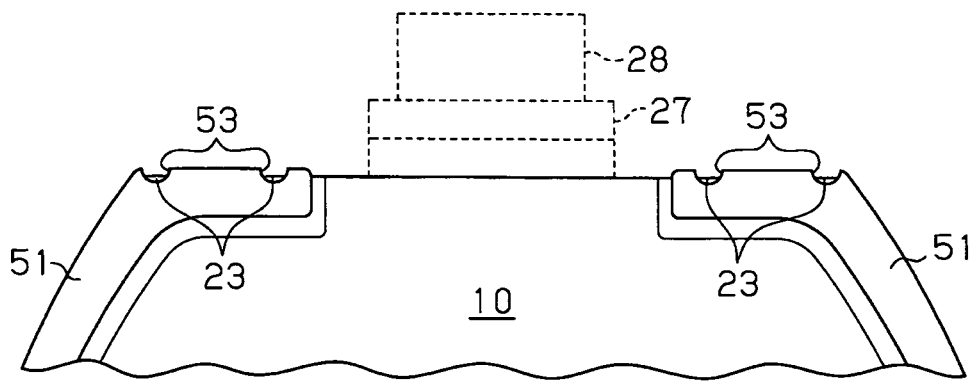

In the above embodiment, each of the windows 26 is provided inside from the outermost edge of the corresponding upper heat-welded portion 23 in such a manner that the outermost edge of the upper heat-welded portion 23 is not positioned inside the window 26. However, the outermost edge of each upper heat-welded portion 23 may be partially positioned inside the corresponding window 26. For example, instead of each window 26, a semi-circular notched window 53 may be provided at the outer edge of the part of each reinforcing member 25 positioned on the corresponding upper heat-welded portion 23 as shown in FIG. 5B, and the outermost edge of each upper heat-welded portion 23 may be partially positioned inside the corresponding window 53.

Figure 5C:
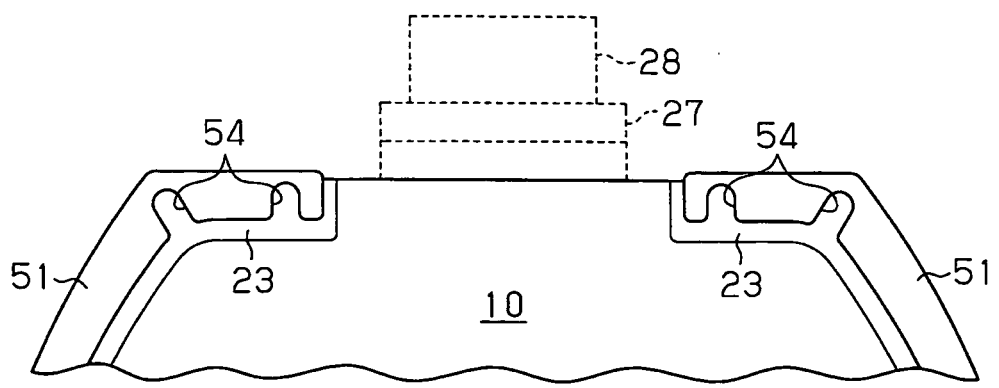
Figure 6A:
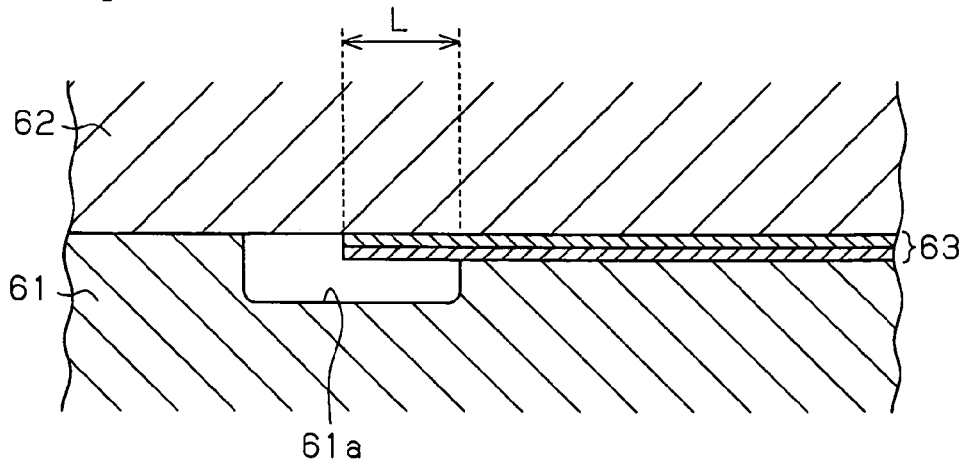
FIGS. 6A, 6B, and 6C are cross-sectional views for explaining a method for forming a reinforcing member of a conventional packaging bag.
Figure 6B:
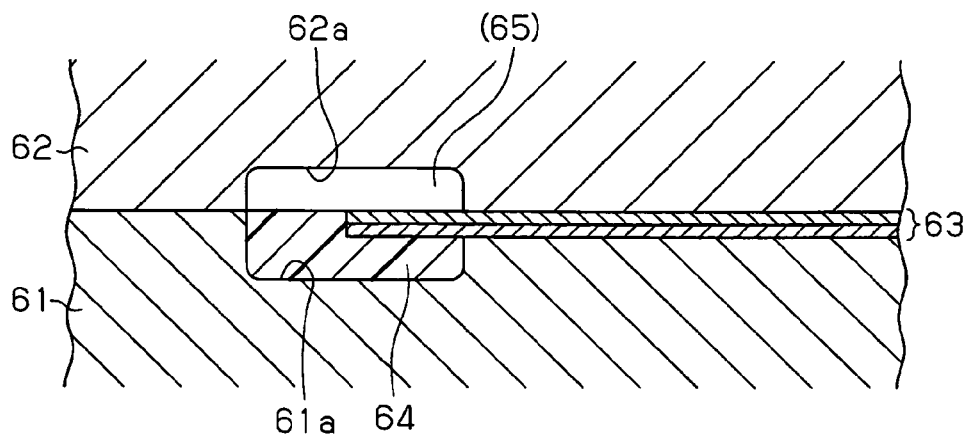
Figure 6C:
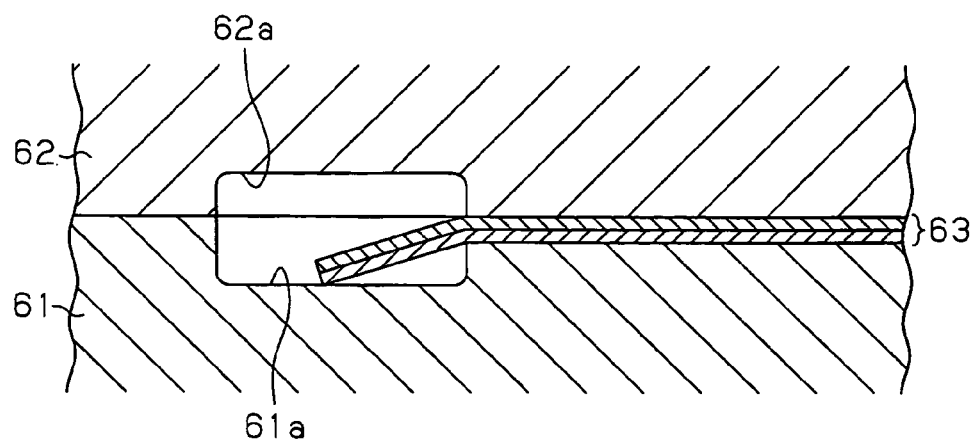

Instead of each window 26, an approximately semi-oval shape notched window 54 may be provided at the inner edge of the part of each reinforcing member 25 positioned on the corresponding upper heat-welded portion 23 as shown in FIG. 5C.

Each of the reinforcing members 25 is not necessarily required to be provided from the upper outer edge of the bag body 10 to the corresponding side outer edge thereof. For example, each of the reinforcing members 25 may be provided only on the corresponding side heat-welded portion 22 of the bag body 10 or only on the corresponding upper heat-welded portion 23 of the bag body 10. Alternatively or in addition, at least one of the reinforcing members 25 may be at least partially positioned at the corresponding bottom heat-welded portion 21.

The number of the reinforcing members 25 provided on the bag body 10 is not limited to two but may be one or three or more. In this instance, the window 26 may be provided on each of the reinforcing members 25.

Each reinforcing member 25 may be constituted with a lower divided half and an upper divided half formed separately as the reinforcing members disclosed in Japanese Laid-Open Patent Publication No. 2003-191964, which has been described in the section of BACKGROUND OF THE INVENTION.

The shape of each reinforcing member 25 is not limited to that of the above embodiment. For example, the transverse dimension X of a part of each reinforcing member 25 positioned on the corresponding upper heat-welded portion 23 may be equal to or smaller than the transverse dimension Y of a part of the reinforcing member 25 positioned on the corresponding side heat-welded portion 22. Alternatively, in order to improve the ease in handling and appearance of the packaging bag, the outermost edge or the innermost edge of each reinforcing member 25 may be formed not linearly but in a wavy shape.

The lower end of each of the reinforcing members 25 may be positioned above the corresponding notch 10a of the bag body 10 or may be at the same position as the upper side of the notch 10a. Alternatively, the lower end of each of the reinforcing members 25 may be at the same position as the bottom outer edge of the bag body 10 or below the bottom outer edge thereof.

The shape of the bag body 10 is not limited to that of the above embodiment. For example, in the above embodiment, the upper outer edge of the bag body 10 is formed linearly extending in the horizontal direction, but may be formed in a raised circular arc shape or a recessed circular arc shape.

Further, in the above embodiment, the bag body 10 is formed approximately in a regular trapezoidal shape when viewed from the front side, but may be formed in a square, rectangular, or triangular shape.

In place of being constituted with one bottom sheet 11 and a pair of side sheets 12, the bag body 10 may be formed by folding one or two flat sheets and heat welding them or may be formed by using a tubular sheet cut in a predetermined length.

The packaging bag of the above embodiment is self-standing, but the packaging bag is not necessarily self-standing. In this instance, the bag body 10 may be constituted only with a pair of side sheets 12.

The shape of each bottom heat-welded portion 21 of the bag body 10 is not limited to that of the above embodiment. For example, in the above embodiment, the upper edge of each bottom heat-welded portion 21 is formed in a recessed circular arc shape but may be formed linearly along the bottom outer edge of the bag body 10. Alternatively, the upper edge of each bottom heat-welded portion 21 may be provided with a linear center part extending in the horizontal direction and a linear lateral part descending toward the center part.

Bonding of the bottom sheet 11 to the side sheets 12 or that of the side sheets 12 does not necessarily need to be conducted by heat welding, but also may be conducted, for example, using an adhesive agent, or by ultrasonic bonding, or high-frequency bonding. Alternatively, in place of being directly bonded, the sheets may be bonded by the reinforcing member 25.

In the above embodiment, the neck 27 is provided at the center of the upper outer edge of the bag body 10. However, there is no limitation on a position at which the neck is provided. For example, the neck 27 may be provided away from the center of the upper outer edge of the bag body 10. Alternatively, the neck 27 may be provided at an upper part of one of the side outer edges of the bag body 10.

The packaging bag of the above embodiment may be provided with a port opened or closed by a zipper in place of the neck 27. Alternatively, the bag body 10 may be notched at any given place so that a part of the bag body 10 is cut off to form a port for taking out contents of the bag body 10.

The invention claimed is:

1. A packaging bag comprising:
   a bag body having a heat-welded portion located at an edge of the bag body;
   a port through which contents are taken out or put into the bag body; and
   thermoplastic resin-made reinforcing members provided on the edge of the bag body to reinforce the bag body,
   wherein each reinforcing member has a longitudinal end, and the longitudinal ends of the reinforcing members face each other with the port placed therebetween,
   wherein each reinforcing member has an approximately U-shaped cross section and is integrally formed by injection molding,
   wherein the reinforcing members enclose the edge of the bag body, the heat-welded portion has an inner edge uncovered by the reinforcing members, and the heat-welded portion has ends adjacent to the port and uncovered by the reinforcing members, and
   wherein a window is provided in the longitudinal end of each reinforcing member.

2. The packaging bag according to claim 1, wherein each window is provided at a part of one of the reinforcing members that is positioned inside from an outermost edge of the bag body.

3. The packaging bag according to claim 1, wherein each window is provided at a part of one of the reinforcing members that is in the vicinity of the port.

4. The packaging bag according to claim 1, wherein one of the reinforcing members is provided at least at an upper outer edge of the bag body, and wherein one of the windows is provided at a part of the reinforcing member provided at the upper outer edge of the bag body.

5. A method for manufacturing the packaging bag according to claim 1, the method comprising:
   placing the bag body between a pair of molds respectively having recesses and clamping the two molds in such a manner that corresponding pairs of the recesses are opposed to each other, wherein a cavity formed by each corresponding pair of the recesses of the thus clamped molds is formed so as to coincide with an outer shape of each reinforcing member, a projection extends from a bottom face of each recess at a part of the cavity corresponding to the longitudinal end of each reinforcing member and the edge of the bag body except the inner edge and the ends of the heat-welded portion is placed inside the cavities in a state of being held by the projections; and
   injecting melted or softened thermoplastic resin to fill the cavities of the thus clamped molds in order to form the reinforcing members at the edge of the bag body.

* * * * *